May 26, 1959     A. T. McCORD     2,888,320
PROCESS OF EXTRACTING AND RECOVERING COLUMBIUM
AND TANTALUM VALUES FROM THEIR
ORES AND PRODUCTS THEREOF
Filed Dec. 21, 1955
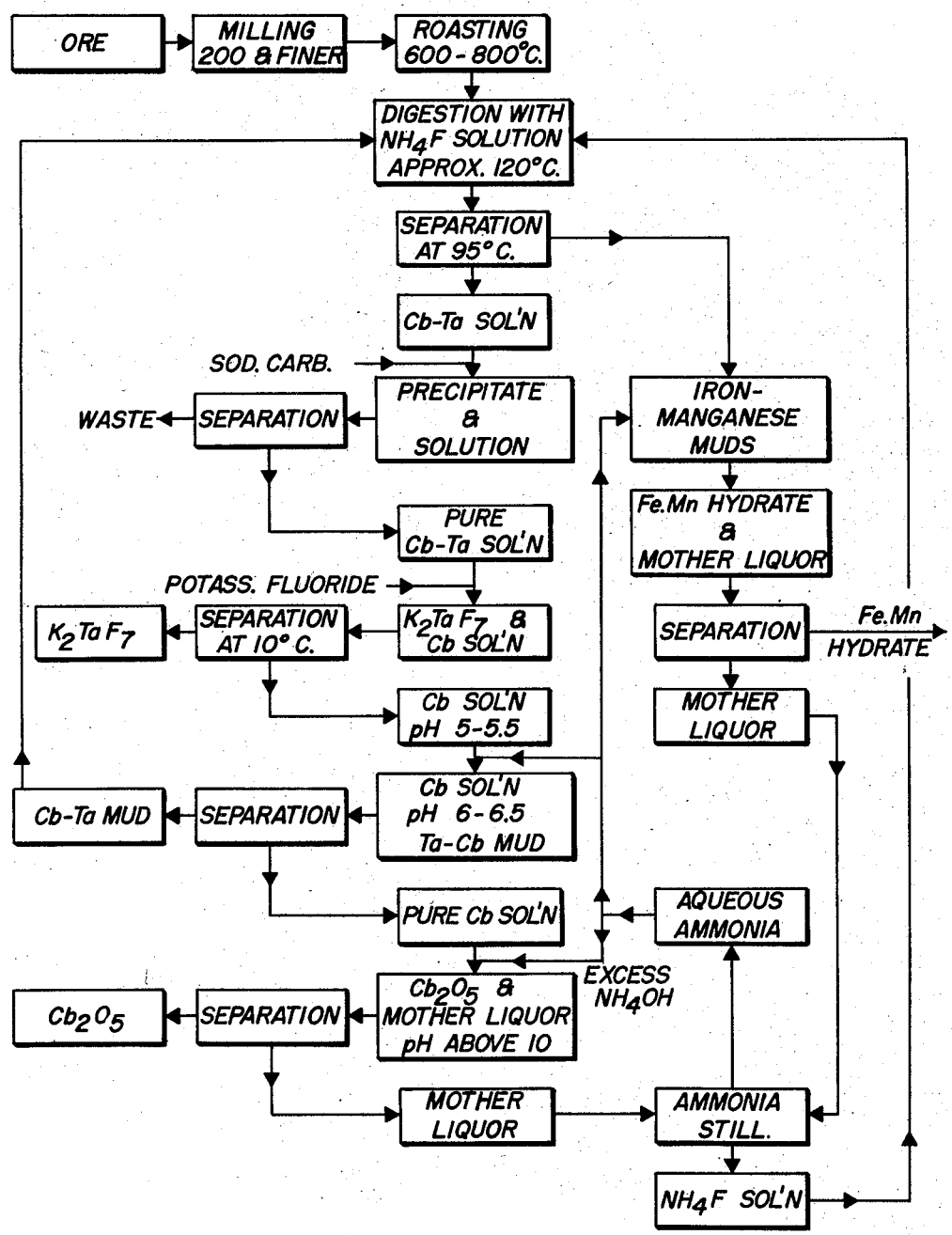
INVENTOR.
ANDREW T. McCORD
BY 
ATTORNEY United States Patent Office
2,888,320
Patented May 26, 1959

2,888,320

PROCESS OF EXTRACTING AND RECOVERING COLUMBIUM AND TANTALUM VALUES FROM THEIR ORES AND PRODUCTS THEREOF

Andrew T. McCord, Snyder, N.Y.

Application December 21, 1955, Serial No. 554,466

15 Claims. (Cl. 23—88)

This invention relates to processes for and useful in the extraction and separate recovery of columbium and tantalum values from their ores. It also relates to certain novel columbium and tantalum compounds obtained by such processes.

The minerals columbite and tantalite can be considered as the end members of an isomorphous series of the general formula $(Fe,Mn)O.(Ta,Cb)_2O_5$, wherein columbite is $(Fe,Mn)O.Cb_2O_5$ and tantalite is $(Fe,Mn)O.Ta_2O_5$. Wherever two elements are set forth together within parentheses in a formula as thus, $(Fe,Mn)O$, it herein means any proportions of the two elements adding up to one atom, e.g., FeO or MnO or a mixture of FeO and MnO equivalent to one molecule. Columbium and tantalum are invariably found together in nature and it is customary practice to refer to those minerals in which the columbium content predominates over the tantalum content as columbite ores and to refer to those ores in which the tantalum content predominates over the columbium content as tantalite ores. In these minerals the iron and manganese are usually in the reduced state, that is, in the ferrous and manganous forms. The minerals also contain various minor impurities such as titanium, silicon, tin, aluminum, chromium and sometimes other elements.

This series of minerals will hereinafter be referred to as "columbite" unless otherwise stated. Columbite exhibits extreme resistance to chemical attack and the oxides of both columbium and tantalum are also insoluble in most acids. Consequently the extraction and recovery of the pure oxides from the natural ore or mineral is difficult, especially the effecting of the separation of columbium from tantalum.

Tantalum is widely used in the chemical industry because of its corrosion resistance under many conditions at comparatively low temperatures, and both columbium and tantalum are useful in the stainless steel industry for stabilizing alloys. Furthermore columbium is finding new applications in the electronic field and in the production of nuclear power. It is therefore desirable to find better methods for separately extracting these two metals in usable form from their ores than those now available.

It is therefore an object of the present invention to provide new and simple methods for extracting and separately recovering pure tantalum oxide or potassium fluotantalate and pure columbium oxide from their ores.

It is a further object of the invention to provide a process of recovering columbium and tantalum values from their ores in which the solvent material used in the process is recovered to a large extent and reused in the process.

Other objects and advantages accruing from the present invention will become apparent as the process is described.

The single figure of the drawing depicts a flow sheet of the steps of the process, including many of the preferred conditions of operation for the individual steps of the process.

The present invention provides an inexpensive and simple chemical process of extracting and separately recovering columbium and tantalum from their ores in the form of usable columbium and tantalum compounds. The process centers about the use of ammonium fluoride as the solvent material for the ore and provides for the recovery and reuse of the solvent employed in the process. The process can be described in outline as comprising the following steps.

(1) The columbite ore is ground to a suitable degree of fineness.

(2) The ground ore is roasted at a temperature above 600° C. but below 800° C. to oxidize the iron and manganese to their higher valent states.

(3) The roasted ore is digested in ammonium fluoride solution at atmospheric pressure or above at or near the boiling point. The columbium and tantalum go into solution as complex fluorides whereas the iron and manganese in their higher valency forms yield insoluble complex fluorides.

(4) The slurry from the ammonium fluoride digestion is diluted, if necessary, and filtered. The residue is washed with dilute ammonium fluoride and the filtrates combined. The combined filtrates contain the columbium and tantalum together with such impurities as titanium, silicon, tin, aluminum, chromium and possibly other elements in solution as complex compounds.

(5) A soluble sodium compound, such as sodium carbonate, is added to the combined filtrates to produce a crystalline deposit which contains the bulk of the minor metal impurities, either as complex sodium-fluorine compounds or as fluorides adsorbed on complex sodium-fluorine compounds. Some small, but inconsequential, amounts of columbium and tantalum are also present in the precipitate. The precipitate is separated, leaving a comparatively pure solution of columbium and tantalum ammonium fluorides.

(6) Sufficient soluble potassium salt such as potassium fluoride is added to the purified filtrate to combine with the tantalum contained in the filtrate and form potassium fluo-tantalate. This compound is only slightly soluble in water, less soluble in fluoride solutions, and its solubility decreases as the temperature is decreased. The treated filtrate is therefore cooled, preferably to 10° C., whereupon the major part of the tantalum is removed as the crystalline compound, potassium fluo-tantalate ($K_2TaF_7$). The potassium fluo-tantalate can be dried and used directly to make tantalum metal by methods well-known in the art, or it can be recrystallized from water, or it can be hydrolyzed in ammonia and the tantalum recovered as tantalum hydrate in a manner similar to that outlined below in steps 8 and 9 for the recovery of columbium hydrate, in which latter case the solution of potassium and ammonium fluoride can be recovered and used again to produce additional potassium fluo-tantalate.

(7) The mother liquor from step 6 which contains all the columbium and a small amount of residual tantalum is treated with a calculated amount of ammonia to produce a precipitate at room temperature which, upon heating, dissolves. Upon recooling, a precipitate again is formed which contains substantially all of the tantalum. This precipitate is separated from the liquid. By this operation all the remaining tantalum and a very small amount of columbium is removed from the solution.

(8) A large excess of ammonia is added to the purified columbium solution whereupon a precipitate of columbium hydrate forms and is removed. The filtrate and washings are reused in subsequent digestion operations after stripping off the ammonia.

(9) The columbium hydrate is completely soluble in a small amount of a concentrated mineral acid other than hydrofluoric acid such as concentrated hydrochloric acid or concentrated sulphuric acid. Upon boiling the acid solution the columbium oxide is quantitatively precipitated by thermal hydrolysis as an exceptionally pure material, the associated metal impurities remaining in solution in the acid liquor.

(10) The insoluble iron and manganese residues from the digestion with ammonium fluoride in step 3 above are slurried with an excess of ammonia, usually with the addition of a small quantity of an oxidizing agent such as hydrogen peroxide. Insoluble iron and manganese hydrous oxides result and the ammonium fluoride goes into solution. The resulting slurry is filtered, the filtrate stripped of ammonia and the resulting ammonium fluoride solution concentrated and reused. With the exception of the sodium salt precipitate obtained from step 5 above, all the fluoride residues and filtrates can be reprocessed by adding them to the ammonium fluoride digestion operation.

The process is described in further detail below under the various headings covering the different phases of the entire operation.

Ore preparation

The columbite ore as received is first ground in any conventional type of ore grinding equipment to a suitable degree of fineness. For example, in the laboratory it can be easily reduced to under 200 mesh particle size in a steel ball mill with 1 inch steel balls. The ground ore is then roasted in layers ½ inch thick in a conventional muffle. At 600° C. complete oxidation under such conditions requires about 1 hour. If the temperature rises above 800° C. it has been found that the subsequent digestion in ammonium fluoride is retarded. In roasting, the ferrous and manganous constituents of the ore are oxidized according to the following equations:

$$4FeO + O_2 \rightarrow 2Fe_2O_3$$
$$4MnO + O_2 \rightarrow 2Mn_2O_3$$

The roasted ore can be said to consist fundamentally of material having the empirical formula $$(Fe,Mn)_2O_3 \cdot 2(Ta,Cb)_2O_5$$

Digestion or solution stage

The roasted ore is digested with ammonium fluoride at or above atmospheric pressure and at or near the boiling point. Although digestion under pressures above atmospheric pressure is faster and effective, it is unnecessary to carry on the digestion at pressures above atmospheric. Also the digestion can be carried out at temperatures slightly under the boiling point. Satisfactory solution of the ore for the purpose of recovering the columbium and tantalum values contained in the ore has been obtained under the following conditions:

One pound of ground columbite ore, all of which passed 200 mesh, was roasted at 625° C. for two hours. It was then mixed with 2.54 pounds of ammonium fluoride and one gallon of water in a dense carbon container and heated to boiling. An iron or steel container can be used, if desired. The slurry was agitated with a stirrer which can be graphite or iron, although stainless steel is not satisfactory. The temperature rose slowly until a concentration of about 30% ammonium fluoride was attained. The boiling point at this point was 118° to 120° C. Boiling was continued, and water added continuously to maintain the boiling point at this level. The slurry which had a reddish color slowly turned grey with the evolution of ammonia continuously while the pH of the slurry slowly fell to about 5.5. After 8 hours of boiling the slurry showed a distinct increase in acidity and at 4.5 pH the digestion was stopped. The volume of the slurry was increased 50% with water and the slurry filtered at 95° C. The filter cake was washed with 2% ammonium fluoride solution. The filtrate possessed a volume of 2.5 liters, and contained approximately 95% of the columbium and tantalum originally present in the ore. This filtrate is designated as Filtrate No. 1. When complete digestion in ammonium fluoride has taken place in accordance with the present process, the main soluble products are ammonium fluotantalate—$(NH_4)_2TaF_7$ and ammonium columbyl fluoride—$(NH_4)_2CbOF_5$ and ammonium fluoride. Also in solution are minor amounts of such compounds as ammonium fluo-titanate of the formula $(NH_4)_2TiF_6$ and ammonium fluoro-silicate of the formula—$(NH_4)_2SiF_6$ and similar fluoride complexes of aluminum, chromium, tin and other impurity elements.

The insoluble products of the above digestion slurry are primarily ferric ammonium fluoride $(NH_4)_3FeF_6$ and manganic ammonium fluoride $(NH_4)_3MnF_6$. The insoluble material also contains any rare earths as fluorides, ammonium zirconium fluoride and the alkaline earth fluorides such as barium and calcium. As shown by Equation 1 below one pound of the mineral columbite of the hypothetical type which would contain no tantalum, and having the theoretical original formula of $(Fe,Mn)O \cdot Cb_2O_5$, when roasted to form $$(Fe,Mn)_2O_3 \cdot 2Cb_2O_5$$

would require 1.71 pounds of ammonium fluoride per pound of roasted mineral to produce a digested slurry product of soluble and insoluble complex fluorides as indicated. Because the atomic weight of iron is 56 and manganese 55 these values are approximately accurate for the same equation using manganese instead of iron as shown by the equation.

Calculations      Digestion

1.

$$Fe_2O_3 \cdot 2Cb_2O_5 + 32NH_4F \longrightarrow 2(NH_4)_3FeF_6 + 4(NH_4)_2CbOF_5 + 18NH_3 + 9H_2O$$

| 692# | + 1184# | 448# | + | 960# | + 306# | + 162# |
| or 1# | + 1.71# | 0.645# | + | 1.39# | + 0.44# | + 0.235# |

Also, 1 pound of the hypothetical mineral tantalite having the formula $(Fe,Mn)O \cdot Ta_2O_5$ when roasted to a material having the formula $(Fe,Mn)_2O_3 \cdot 2Ta_2O_5$, assuming such a hypothetical mineral existed with no columbium content, would require per pound of roasted tantalite 1.415 pounds of ammonium fluoride to produce the digested slurry product of soluble and insoluble fluoride as indicated in the Equation 2 below.

2.

$$Fe_2O_3 \cdot 2Ta_2O_5 + 40NH_4F \longrightarrow 2(NH_4)_3FeF_6 + 4(NH_4)_2TaF_7 + 26NH_3 + 13H_2O$$

| 1044# | + 1480# | 448# | + | 1400# | + 442# | + 234# |
| or 1# | + 1.415# | 0.427# | + | 1.34# | + 0.424# | + 0.224# |

However because it is desirable to maintain some free ammonium fluoride in the solution of the ore in order to suppress the solubility of iron and manganese it has been found highly desirable to use approximately 2½ pounds of ammonium fluoride per pound of roasted ore.

Purification of columbium-tantalum fluoride solutions 5 grams of sodium carbonate as a saturated solution was added to each liter of filtrate 1. Although sodium carbonate is preferred, other soluble sodium compounds can be used such as sodium hydroxide or sodium sulfide.

Within one hour a distinct crystalline precipitate settled out. This precipitate was separated from the mother liquor and contained as its major constituents sodium, aluminum, titanium, silicon and fluorine. A second similar addition produced a crystalline precipitate which contained small amounts of columbium and tantalum together with sodium and fluorine as major components together with traces of other impurity elements. The filtrate was a virtually pure aqueous solution of columbium and tantalum ammonium fluoride compounds and ammonium fluoride.

The following alternate procedure can be used in place of the sodium carbonate treatment as a means for removal of the minor impurities in the columbium-tantalum digestion solution.

Filtrate 1, instead of being treated with sodium carbonate as above described, is cooled to around 20° C. whereupon a considerable volume of crystals is formed. These crystals consist of $(NH_4)_2TaF_7$ and $(NH_4)_2CbOF_5$. These were removed by filtration and washed with cold 2% ammonium fluoride solution, the filtrates being returned for use in further digestion operations. The washed crystals were dissolved in water and produced a solution containing 12% combined columbium and tantalum calculated as oxides. The level of impurity in the resulting solution was extremely low.

Separation of tantalum values

To the purified solution of columbium and tantalum ammonium fluorides obtained by the sodium carbonate treatment, or by the alternate treatment described above, was added an amount of a saturated solution of potassium fluoride slightly in excess of that required to combine with all the tantalum present in the solution to form the compound, potassium fluo-tantalate $(K_2TaF_7)$. Any soluble potassium compound can be used. However, in order not to introduce other radicals into the system, potassium fluoride, potassium carbonate or potassium hydroxide are preferred. The potassium fluo-tantalate started to crystallize from the solution almost immediately and crystallization became more rapid as the temperature was lowered to 10° C. The potassium fluo-tantalate crystals which were of excellent purity were filtered from the solution at a temperature of 10° C. A typical sample of the potassium fluo-tantalate obtained by the above method, when analyzed by spectrographic methods, indicated a presence of .01% to .1% of columbium, .001% to 0.01% of each of the elements calcium, aluminum, zirconium and tin, and 0.001% each or less of iron, lead and manganese, based on the tantalum. If a still higher degree of purity is desired the potassium fluo-tantalate product can be redissolved in dilute hydrofluoric acid or dilute ammonium fluoride and recrystallized to further purify it.

If pure tantalum oxide is desired, the potassium fluo-tantalate is dissolved in hot water and added to an excess of 10% aqueous ammonia. Tantalum hydrate is produced. This can be filtered off and washed with hot water. The tantalum hydrate is then slurried with ⅓ its weight of hydrochloric acid as 30% solution and boiled. The resulting tantalum oxide is then separated and washed to provide an exceptionally pure and acid insoluble oxide product.

Recovery of the columbium

The filtrate resulting from the separation of the potassium fluo-tantalate contains all the columbium and a small amount of tantalum resulting from the slight solubility of potassium fluo-tantalate in the fluoride solution. At this point, the pH of the solution is between 5 and 5.5. Upon the addition of a small quantity of ammonia at room temperature a precipitate results when the pH is increased to 6.0. This precipitate contains columbium and tantalum in about the same ratio as they are present in the solution. Upon heating to 90° C. or thereabouts, the precipitate dissolves completely and upon recooling to room temperature a precipitate reforms which is chiefly tantalum bearing. Upon repeating the same operation a second time and attaining 6.5 pH the resulting precipitate contains the last traces of tantalum and a small amount of columbium. Both precipitates are returned to the initial ammonium fluoride digestion slurry. The mother liquor is virtually tantalum free.

The thusly purified solution containing ammonium columbyl fluoride, ammonium fluoride, and trace amounts of other metal impurities is then treated with an excess of 10% ammonia. The columbium is precipitated as a hydrous oxide or hydrate. The quantity of ammonia should be more than the amount required to produce $CbO(OH)_3$ although its concentration may vary from 1% or less up to 30%. In actual operation the amount of ammonia used to produce a fast filtering precipitate is about 10 times the theoretical amount required and the final pH should be in excess of 10. The hydrate is filtered from the liquor and washed with hot or boiling water. The resulting solids are then dried and calcined to columbium oxide containing between 0.01 and 0.001% tantalum based on the columbium.

The hydrous columbium oxide filter cake from the preceding step contains between 10 and 25% $Cb_2O_5$ depending upon the conditions of precipitation. This material is completely and rapidly soluble in hydrochloric or sulphuric acid. The actual mechanism of solution is not understood because less acid is required than the theoretical amount to produce $(CbO)_2(SO_4)_3$ or $CbOCl_3$. However, these solutions are not stable and when boiled, complete hydrolysis is accomplished within a few minutes. The hydrous columbium oxide product is readily filtered and washed, the filtrate retaining any residual amounts of impurities which may have carried along with the columbium from the fluoride solution. The filter cake thusly obtained by thermal hydrolysis from a sulphate treatment will contain up to 40% $Cb_2O_5$ whereas from a chloride treatment it will contain 35–40% $Cb_2O_5$. Upon calcination, an anhydrous, acid-insoluble columbium oxide of exceptional purity is obtained.

Recovery and reuse of ammonium fluoride

The residues from the initial ammonium fluoride digestion contain valuable amounts of fluoride. These residues are slurried in water and mixed with an excess of aqueous ammonia. A 10% solution has been found to be satisfactory although other concentrations can also be used. Complete hydrolysis takes place and as hydrous ferric and manganic oxides are precipitated, ammonium fluoride goes into solution in accordance with the following equations:

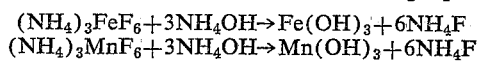

$$(NH_4)_3FeF_6 + 3NH_4OH \rightarrow Fe(OH)_3 + 6NH_4F$$
$$(NH_4)_3MnF_6 + 3NH_4OH \rightarrow Mn(OH)_3 + 6NH_4F$$

The residues are filtered and washed and the combined liquors treated in a stripping system to recover the ammonia, while the stripper effluent which is dilute ammonium fluoride solution is concentrated for reuse in the digestion step or return directly to the digestion step. In some cases minor amounts of manganese tend to remain in solution in this hydrolysis but this can be prevented by the addition of an oxidizing agent, preferably hydrogen peroxide in small amounts. Beating of air into the ammoniacal slurry will accomplish the same effect although not as rapidly.

The basic process as described above is subject to many possible variations all of which are claimed as a part of the present invention. For example, in the case where the raw ore is highly contaminated with impurities such as tin and aluminum, the clear solution obtained from the ammonium fluoride digestion can be treated directly with an excess of ammonia. The precipitate, which contains columbium, tantalum, tin and aluminum is then dissolved in hydrochloric acid or sulphuric acid and thermally hydrolyzed. The tin and aluminum remain in the acid solution while the acid oxides, tantalum and columbium oxides are precipitated. These oxides are separated and washed, with a dilute acid solution, then a dilute ammonia solution, the first to remove mother liquor containing metallic impurities, the second to remove the last traces of hydrochloric or sulphuric acid. The resulting wet filter cake is easily and completely digested in ammonium fluoride solution to yield a pure liquor such as that obtained by the treatment with sodium carbonate in the process as described above, or the alternate treatment referred to in connection therewith.

Strictly speaking ammonium fluoride is a dimolecular compound and has the formula $(NH_4F)_2$. It is a labile compound and readily undergoes the following reaction:

Ammonium fluoride $(NH_4F)_2$, is a neutral material having a pH of 7. When used in the present process in solution it undergoes the above reaction releasing HF and $NH_3$. The $NH_3$ passes off as a gas but the HF remains in the solution, causing it to be acidic. This acid solution attacks the ore, forming metallic fluorides which immediately combine with $NH_4F$ to form a variety of complex fluorides. The solution remains fairly neutral until most of the ore has been digested whereupon the solution becomes acidic which serves to indicate that the digestion is nearing completion. Because of its neutral characteristics it is preferred to use ammonium fluoride $(NH_4F)_2$ in carrying out the digestion operations of the present process. However, other ammonium fluorides can be used. For example, ammonium bifluoride, having a formula variously written as $NH_4F \cdot HF$ or $NH_4HF_2$ can be used, although it is highly acidic in solution and introduces handling problems. Where reference is made herein or in the claims to an ammonium fluoride solution without further specificity it is intended to cover any ammonium fluoride solution with pH in the range 2 to 12.

Having described the invention in detail, it is desired to claim:

1. In the process of extracting high purity columbium and tantalum compounds from their ores the steps comprising treating the roasted ore with ammonium fluoride solution to form a complex fluoride solution containing the tantalum and columbium in soluble form and purifying said solution of tantalum and columbium with a soluble sodium salt to precipitate the minor impurities and separating therefrom the soluble columbium and tantalum compounds remaining in the solution.

2. In the process of extracting high purity columbium and tantalum compounds from their ores, the steps comprising treating the roasted ore with aqueous ammonium fluoride to form a solution containing the tantalum and columbium in the form of soluble complex fluorides, and purifying said soluble tantalum and columbium solution with a small amount of a saturated sodium carbonate solution with a small amount of a saturated sodium carbonate solution to precipitate out the minor impurities, and separating therefrom the soluble columbium and tantalum compounds remaining in the solution.

3. The process of extracting a pure tantalum compound from an ammonium fluoride solution of columbium and tantalum which comprises treating the solution with a soluble potassium salt to form potassium fluotantalate, cooling to precipitate the potassium fluo-tantalate and separating the insoluble potassium fluo-tantalate precipitate from the solution.

4. The process of extracting a pure tantalum compound from an ammonium fluoride solution of columbium and tantalum which comprises treating the solution with potassium fluoride to form potassium fluo-tantalate, cooling to precipitate the potassium fluo-tantalate and separating the insoluble potassium fluo-tantalate precipitate from the solution.

5. The process of extracting a pure tantalum compound from an ammonium fluoride solution of columbium and tantalum which comprises treating the solution with potassium fluoride to form potassium fluo-tantalate, lowering the temperature of the mixture to 10° C. to crystallize out the potassium fluo-tantalate and separating the insoluble potassium fluo-tantalate from the solution.

6. In the process of separately recovering columbium and tantalum compounds from columbite and tantalite ores, the method of removing tantalum from a solution consisting of water and ammonium fluoride containing major amounts of columbium and minor amounts of tantalum which comprises adding ammonia to the solution to raise the pH of the solution to 6.0–6.5 and produce a precipitate containing both columbium and tantalum, heating the resulting slurry around 90° C. until the precipitate dissolves and cooling to reprecipitate any residual tantalum in the solution, separating the precipitate from the solution, and treating the purified solution with a large excess of ammonium hydroxide to form and precipitate an acid-soluble columbium hydrate.

7. The method of removing tantalum from an ammonium fluoride solution containing columbium and tantalum according to claim 6 in which the heating and cooling steps are repeated until the solution upon cooling is substantially tantalum free.

8. The method of extracting and separately recovering pure columbium and tantalum compounds from columbite and tantalite ores which comprises grinding the ore to finely divided condition, roasting the ground ore under oxidizing conditions to oxidize the iron and manganese constituents to ferric and manganic forms, digesting the roasted ore with ammonium fluoride solution to form a complex fluoride solution containing the columbium and tantalum in soluble form, separating the iron and manganese as insolubles, treating the solution with a small amount of a soluble sodium salt to precipitate the minor metal impurities as insolubles, separating the precipitate containing the impurities from the columbium-tantalum solution, adding sufficient potassium fluoride to the purified solution to form potassium fluo-tantalate, cooling to 10° C. to crystallize out the potassium fluo-tantalate, separating the potassium fluo-tantalate from the solution, treating the solution with a small amount of ammonia to form a precipitate at room temperature, heating until the precipitate dissolves and cooling to reprecipitate any residual tantalum in the solution, separating the precipitate from the solution, treating the purified solution with a large excess of ammonium hydroxide to form and precipitate an acid-soluble columbium hydrate, separating the acid-soluble columbium hydrate from the solution, and calcining to obtain the oxide.

9. The method according to claim 8 in which the acid-soluble columbium hydrate, after separation, is further processed by dissolving in a strong mineral acid other than hydrofluoric acid, heating the solution to boiling to completely hydrolyze and precipitate the hydrolyzed oxide product, separating the hydrolyzed product from the solution, and calcining to obtain the pure acid-insoluble, anhydrous oxide.

10. The method of extracting and separately recovering pure columbium and tantalum compounds from columbite and tantalite ores which comprises grinding the ore to finely divided condition, roasting the ground ore under oxidizing conditions to oxidize the iron and manganese constituents to ferric and manganic states, digesting the roasted ore with an aqueous solution of ammonium fluoride to form a complex fluoride solution containing the columbium and tantalum in soluble form, separating the iron and manganese as insolubles, cooling the solution to 20° C. to form a purified crystalline precipitate containing most of the columbium and tantalum constituents, separating the crystalline precipitate from the solution and washing the crystals with cold dilute ammonium fluoride solution, dissolving the washed crystals in water to form a purified solution containing the columbium and tantalum fluorides, adding sufficient potassium fluoride solution to the purified solution to form potassium fluo-tantalate, cooling to 10° C. to crystallize out the potassium fluo-tantalate, separating the potassium fluo-tantalate from the solution, treating the solution with a small amount of ammonia to form a precipitate at room temperature, heating until the precipitate dissolves, and cooling to reprecipitate any residual tantalum in the solution, separating the precipitate from the solution, treating the purified solution with a large excess of ammonium hydroxide to form and precipitate an acid-soluble columbium hydrate, separating the acid-soluble columbium hydrate from the solution, and calcining to obtain the oxide.

11. The method according to claim 8 in which the mother liquor after removal of the columbium and tantalum constituents is stripped of ammonia and the ammonium fluoride solution recovered for reuse.

12. The method according to claim 8 in which the mother liquor after removal of the crystals of columbium and tantalum ammonium fluorides, is returned to the digestion step.

13. In the process of extracting and separately recovering columbium and tantalum values from their ores, the steps comprising digesting the ore in a solution consisting of water and ammonium fluoride to form a complex fluoride solution containing the columbium and tantalum in soluble form, and separately recovering the columbium and tantalum values therefrom.

14. In the process of extracting and recovering tantalum-free columbium from columbium ores, the steps comprising digesting the ore in a solution consisting of water and ammonium fluoride to form a complex fluoride solution containing the columbium in soluble form, precipitating the impurities therefrom as insoluble fluorides, and subsequently separately recovering the pure columbium values therefrom.

15. In the process of extracting high purity columbium and tantalum compounds from their ores the steps comprising treating the ore with ammonium fluoride solution to form a complex fluoride solution containing the tantalum and columbium in soluble form and purifying said solution of tantalum and columbium with a soluble sodium salt to precipitate the minor impurities and separating therefrom the soluble columbium and tantalum compounds remaining in the solution.

References Cited in the file of this patent

"Comprehensive Treatise on Inorganic and Theoretical Chemistry" (Mellor), vol. 9 (1929), pages 841, 843, 860, 861, 867, 872, 895, 896, 898, 899, 914 and 916 relied on.

"Chemical Abstracts" (Bhattacharya), vol. 47, No. 15 (Aug. 10, 1953), col. 7370g relied on.